United States Patent [19]

Fork

[11] Patent Number: 4,805,358

[45] Date of Patent: Feb. 21, 1989

[54] ELECTRICAL TRENCH ASSEMBLY

[75] Inventor: Frank W. Fork, Allison Park, Pa.

[73] Assignee: H. H. Robertson Company, Pittsburgh, Pa.

[21] Appl. No.: 43,561

[22] Filed: Apr. 27, 1987

[51] Int. Cl.$^4$ .............................................. E04D 15/00
[52] U.S. Cl. ...................................... 52/126.2; 254/104
[58] Field of Search ................... 52/220, 126.2, 126.5; 254/104

[56] References Cited

U.S. PATENT DOCUMENTS

| | | | |
|---|---|---|---|
| 875,775 | 1/1908 | Burhorn | 52/126.5 |
| 2,123,484 | 7/1938 | Mafera | 254/104 |
| 2,164,615 | 7/1939 | Mafera | 254/104 |
| 2,524,961 | 10/1950 | Cramer, Jr. | 254/104 |
| 2,539,703 | 1/1951 | Sato | 254/104 |
| 3,074,208 | 1/1963 | Seidel | 50/127 |
| 3,084,480 | 4/1963 | Fork | 50/126 |
| 3,166,633 | 1/1965 | Guzan, Jr. et al. | 174/101 |
| 3,530,627 | 9/1970 | Carter et al. | 52/221 |
| 3,545,150 | 12/1970 | Butler | 52/220 |

Primary Examiner—Carl D. Friedman
Attorney, Agent, or Firm—G. E. Manias

[57] ABSTRACT

A trench assembly usable in floor structures of the type requiring one inch of concrete fill over the crests of metal cellular flooring. The trench assembly includes opposite sides and one or more end-abutted cover plates spanning the distance between and supported by the opposite sides. Each side comprises a side rail, a base member, and horizontally displaceable adjustment means, in the form of wedge means, for vertically displacing the side rail relative to the base member. The side rail, the base member and the adjustment means have a combined height of about one inch (2.54 cm) and are capable of a vertical adjustment of one-half inch (1.27 cm).

12 Claims, 4 Drawing Sheets

ELECTRICAL TRENCH ASSEMBLY

BACKGROUND OF THE INVENTION

This invention relates to underfloor electrical distribution systems for buildings, and more particularly to electrical trench assemblies having improved means for vertically adjusting the opposite sides thereof.

The use of electrical trench assemblies to provide an electrified floor structure in modern buildings is well known in the art. The trench assembly may be used in cooperation with metal cellular flooring or in reinforced concrete flooring wherein cooperation is not required with metal cellular flooring. In either floor construction, it is difficult to lay a concrete layer so that the top surface thereof is completely level throughout.

Consequently, trench assemblies have included adjustment means by which at least the cover plates are disposed flush with the upper surface of the concrete floor.

Heretofore, the required vertical adjustment has been accomplished in three ways. In one instance, adjustment means including vertical levelling screws are provided at each side of the trench whereby the cover plate may be adjusted to a limited degree relative to the sidewalls which are each of a one-piece construction, see U.S. Pat. 3,166,633 (Guzan, Jr., et al). In the second instance, each trench side is of a three-piece construction wherein two of the pieces are manually adjustable relative to a stationary third piece. The pieces of each side are held in adjusted relation by clamping screws, see U.S. Pat. 3,530,627 (Carter et al). In a third instance, each trench side is of a two-piece construction including at least an upper side rail supporting the cover plate and a stationary lower element, the side rail and lower element being connected by a vertically oriented leveling screw. Typical examples of this third instance are provided, for example, by U.S. Pat. Nos. 3,074,208 (Seidel), 3,084,480 (Fork), and 3,545,150 (Butler).

The above-identified vertical adjustment methods operate satisfactorally in the intended floor structure environments. However, in floor structures designed to require a fill of concrete or other material of one to one and one-half inch above the crests of the metal cellular units, the known trench assemblied cannot be used. The vertical adjustment arrangements exceed the one to one and one-half fill requirement.

BRIEF SUMMARY OF THE INVENTION

The principle object of this invention is to provide novel horizontally displaceable adjustable means for vertically displacing the side rails of a trench assembly to provide the required vertical adjustment.

Another object of this invention is to provide a practical trench assembly usable with metal cellular flooring wherein a minimum of one inch of concrete fill or other material can be provided over the crest of metal cellular flooring.

Still another object of this invention is to provide an electrical trench assembly wherein a solid structural support is provided for the cover plates during all phases of vertical adjustment thereby eliminating structural rotation of the side rails as encountered in prior systems.

This invention provides an improvement in an electrical trench assembly of the type having opposite sides and a cover plate spanning the distance therebetween. In its broadest aspects, the present invention contemplates opposite sides each comprising a side rail supporting one edge of the cover plate, a base member disposed beneath the side rail, and horizontally displaceable adjustment means for vertically displacing the side rail relative to the base member. Stop means is provided for limiting the vertical displacement of each side rail.

In accordance with this invention, the horizontally displaceable adjustment means comprises wedge means overlying the upper face of the base member and supporting the side rail and displacement means operable from the exterior of said trench assembly for moving the wedge means laterally toward and away from the side rail. The side rail presents a rail lower face which is inclined relative to the base upper face and the wedge means presents a wedge upper face in surface engagement with and slidable relative to the rail lower face. In a preferred arrangement, the rail lower face and the wedge upper face of each side are inclined inwardly toward the opposite side.

Further in accordance with this invention, the displaceable means for moving the wedge means laterally toward and away from the side rail, comprises a generally horizontally disposed threaded member having one end rotatably connected to the wedge means and being threadedly engaged with a threaded opening presented in an upstanding wall portion of the base member. Lock means is provided for locking the side rail in vertically adjusted position. Guide means is provided for precluding lateral movement of the side rails relative to the base members during vertical movement thereof.

DESCRIPTION OF THE PREFERRED EMBODIMENTS (S)

Figure 1:
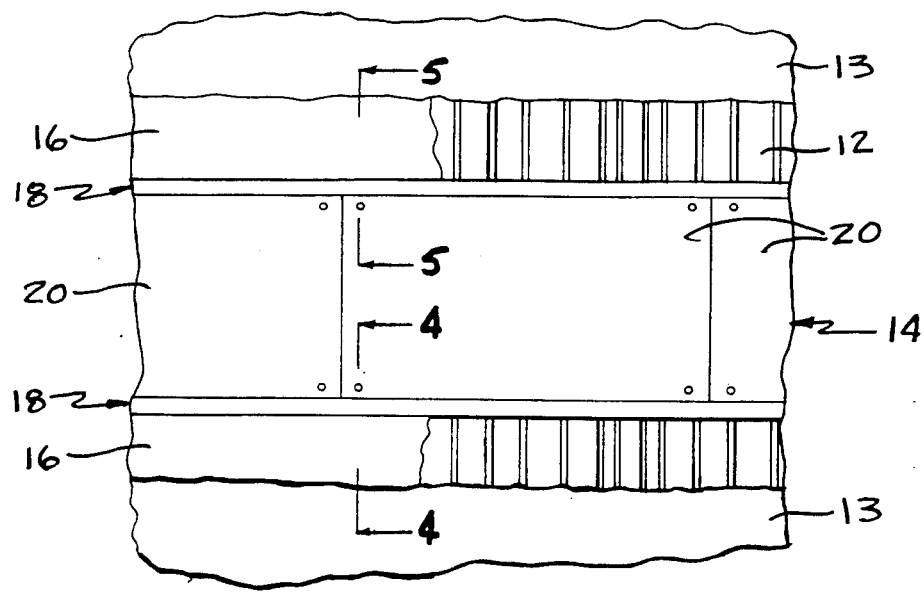
FIG. 1 is a fragmentary plan view of a floor structure incorporating the trench assembly of this invention.

FIG. 1 illustrates a floor structure 10 comprising, for example, metal cellular units 12 supported on a substructure 13, a trench assembly 14 of this invention overlying the cellular units 12, and a layer of concrete 16 overlying the metal cellular units 12 and surrounding the trench assembly 14. The substructure 13 may comprise grade or the structural slab of a first floor or basement structure. Alternatively, these substructure 13 may comprise a reinforced concrete floor structure of a multi-story builing. The present trench assembly 14 also finds utility in the floor structures of steel frame buildings wherein the floor structure comprises a metal subfloor supporting a overlying layer of concrete.

Figure 2:
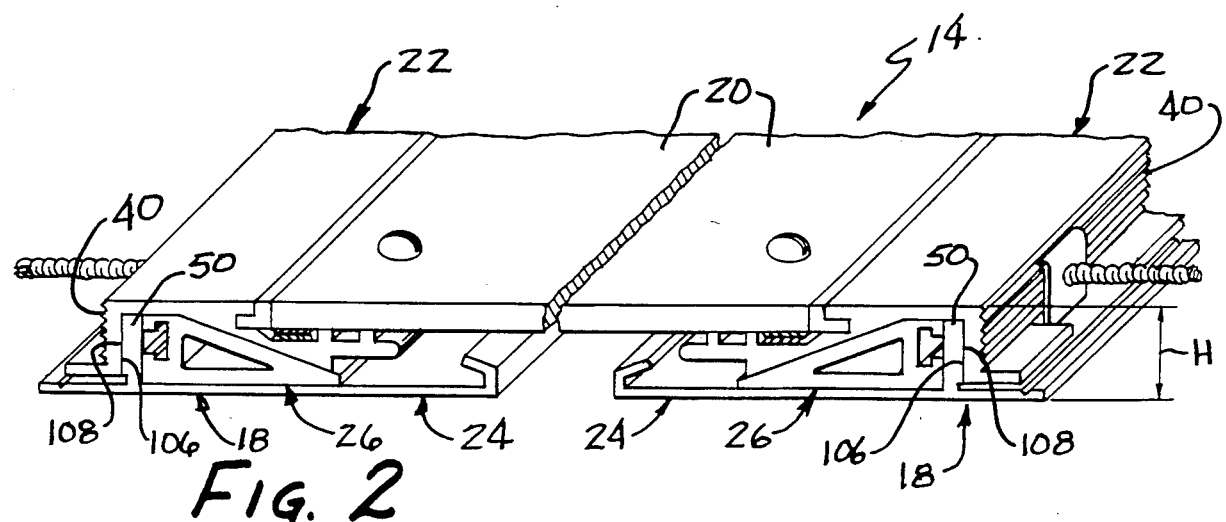
FIG. 2 is a broken isometric view of the present trench assembly.

Referring to FIG. 1 and 2, the present trench assembly 14 comprises, in part, opposite sides 18 and one or more end-abutted cover plates 20 spanning the distance between and supported by the opposite sides 18. As best seen in FIG. 2, the sub-assembly 17 presents a relatively low profile and may be provided in a height indicated at H of about one inch (2.54 cm) with a vertical adjustment of about one-half inch (1.27 cm). In accordance with this invention, each of the opposite sides 18 comprises a side rail 22 supporting one edge of the cover plates 20; a base member 24 disposed beneath the side rail 22; and horizontally displaceable adjustment means 26 interposed between the side rail 22 and the base member 24 for vertically displacing the side rail 22 relative to the base member 24. The adjustment means 26 is operable from the exterior of the trench assembly 14 by displacement means 70, as will hereinafter be described.

Figure 3:
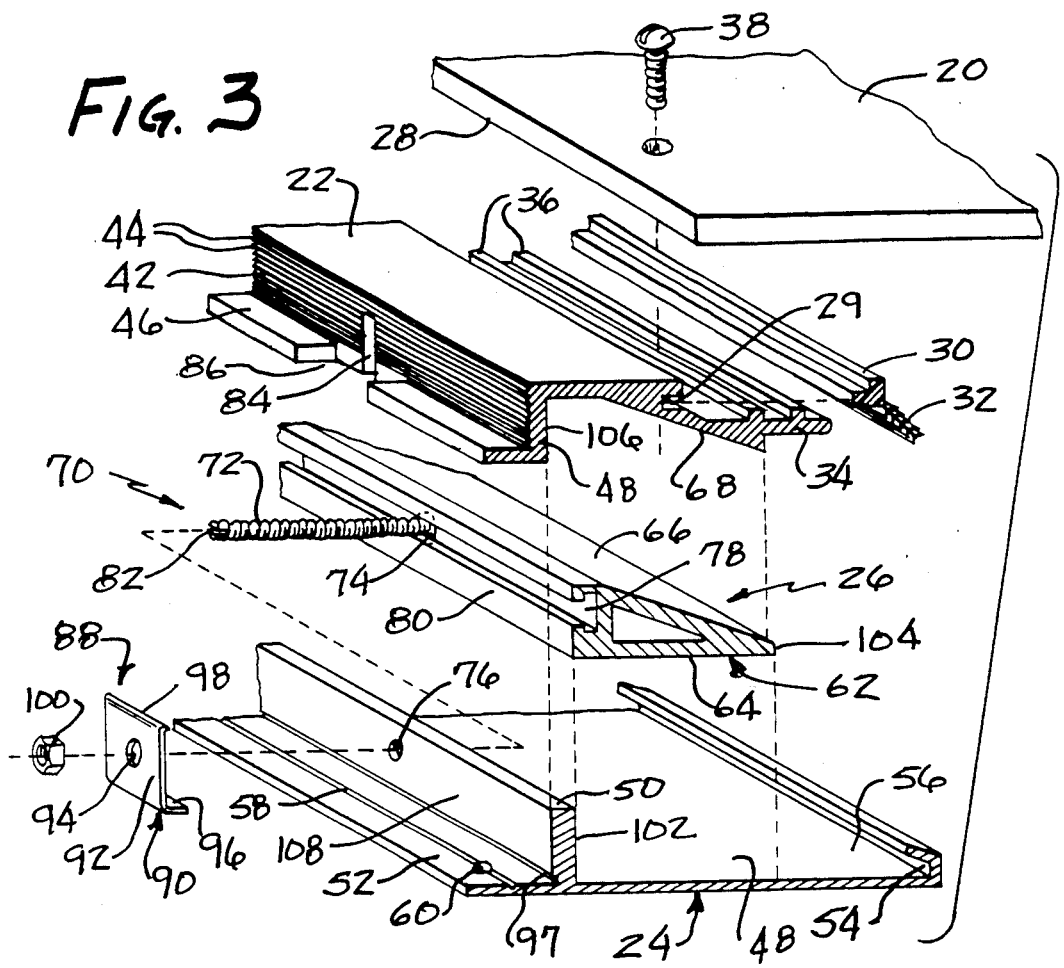
FIG. 3 is a fragmentary isometric view, in exploded form, illustrating the components of the vertically adjustable side of the present trench assembly.

Referring to FIG. 3, the side rail 22 is adapted to support one edge portion 28 of the cover plate 20. The side rail 22 may include a lengthwise groove 29 that receives one arm of a reversable trim strip 30. The trim strip 30 may have an attached gasket element 32 which will underlie the cover plate edge portion 28 and provide an effective watertight seal. The side rail 22 has a horizontal extension 34 provided with spaced-apart ribs 36. Threaded openings (not visible) provided between the ribs 36 are positioned to receive hold down screws 38 for securing the cover plate 20 to the side rail 22. A depending wall portion 40 is provided along the outboard edge of the side rail 22. The wall portion 40 presents an outboard face 42 provided with lengthwise serrations 44. The wall portion 40 terminates along its lower edge in an outwardly extending flange 46 that cooperates with the serrations 44 of the wall portion 40 to anchor the side rail 22 in an abutting layer of concrete.

The base member 24 presents a base upper face 48, an upstanding wall portion 50 adjacent to an outboard edge portion 52 and a receiving groove 54 along the opposite or inboard edge portion 56. The outboard edge portion 52 presents a lengthwise groove 58 adapted to serve as a drill guide for drilling openings 60 therein for receiving pop rivets employed to secure the base member 24 to a subjacent metal cellular unit.

The adjustment means 26 comprises wedge means 62 having a wedge lower face 64 adapted to overly and slide relative to the base upper face 48, and a wedge upper face 66 which is adapted to engage and slide relative to a rail lower face 68 of the side rail 22. Displacement means 70 is provided for moving the wedge means 62 laterally toward and away from the siderail 22. It will be observed that the wedge upper face 66 and the rail lower face 68 are inclined relative to the base upper face 48. In particular, the faces 66, 68 are inclined downwardly and inwardly toward the opposite side 18 of the trench 14. Thus movement of the wedge means 62 toward the interior of the trench 14 causes the side rail 22 to be displaced vertically and hence provide an adjustment in the height H (FIG. 2) of the side rail 22 relative to the base member 24.

The displacement means 70 comprises a generally horizontal threaded member 72 having one end 74 rotatably connected to the wedge means 62 and being threadedly engaged with a threaded opening 76 presented by the upstanding wall portion 50 of the base member 24. In a working embodiment, the threaded member 72 comprises an elongated screw having the head 74 thereof captively retained in and rotatable within a lengthwise T-shaped groove 78 presented in an outboard wall portion 80 of the wedge means 62. The opposite end of the threaded member 72 is slotted as at 82 to receive a screwdriver to rotate the threaded member 72 in the appropriate direction.

The depending wall portion 40 of the side rail 22 is provided with a vertically presented slot 84 which is open at the bottom end. The flange 46 is cut away in the region of the slot 84 to provide a gap 86. When the side is assembled, the threaded member 72 extends through the slot 84.

Lock means 88 is provided for locking the side rail 22 in vertically adjusted position. The lock means 88 comprises, in part, the serrations 44 presented in the outboard face 42 of the depending side wall portion 40, a clip member 90, and a nut 100. The clip member 90 includes a vertical wall 92 provided with a central opening 94 through which the threaded member 72 extends; a horizontally presented strip 96 at its lower end that is received by a lengthwise groove 97 provided at the lower end of the upstanding wall portion 50 of the base member 24; and a sharp edge 98 at its upper end that interfits the serrations 44 of the depending wall portion 40. The nut 100 secures the clip member 90 in position.

The wedge means 62 is displacable laterally along the upper face 48 of the base member 24 between two extreme proptions. In a first position (FIG. 4) the outboard wall portion 80 of the wedge means 62 engages an inboard face 102 of the upstanding wall portion 50 and the side rail 22 is in its lowermost position. In a second extreme position (FIG. 5), a leading edge 104 of the wedge means 62 is received in the receiving groove 54 of the base member 24 and the side rail 22 is in its maximum vertically displaced position. Thus the upstanding wall portion 50 and the receiving groove 54 serve as stop means limiting vertical displacement of the side rail 22.

Reverting to FIG. 3, the depending wall portion 40 of the side rail 22 presents a inboard face 106 which is adapted to engage and slide over an outboard face 108 of the upstanding wall portion 50. It will be observed in FIG. 2 that with the base members 24 in fixed position, the depending wall portions 40 of the side rails 22 are disposed outboard of the upstanding wall portions 50 of the base members 24. Thus during vertical displacement of the side rails 22, the side rails 22 are guided by the wall portions 50 and precluded from movement relative to the base members 24 in a direction transverse to the side rails 22.

Figure 4:
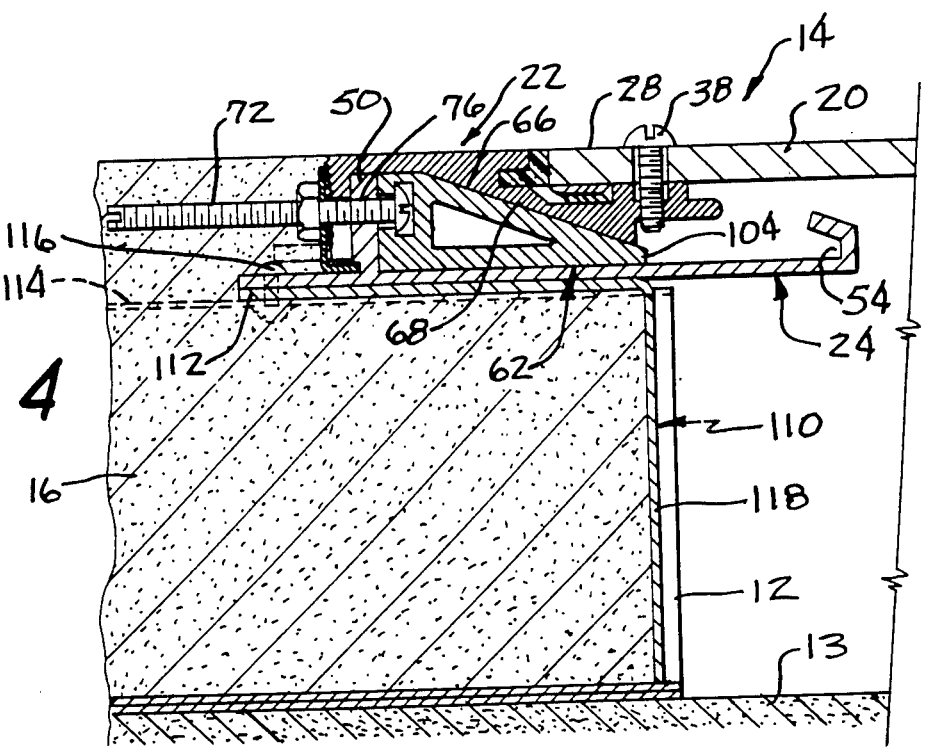
FIG. 4 is a cross-sectional view, taken along the line 4—4 of FIG. 1, showing one side of the present trench assembly in a non-elevated position.
Figure 5:
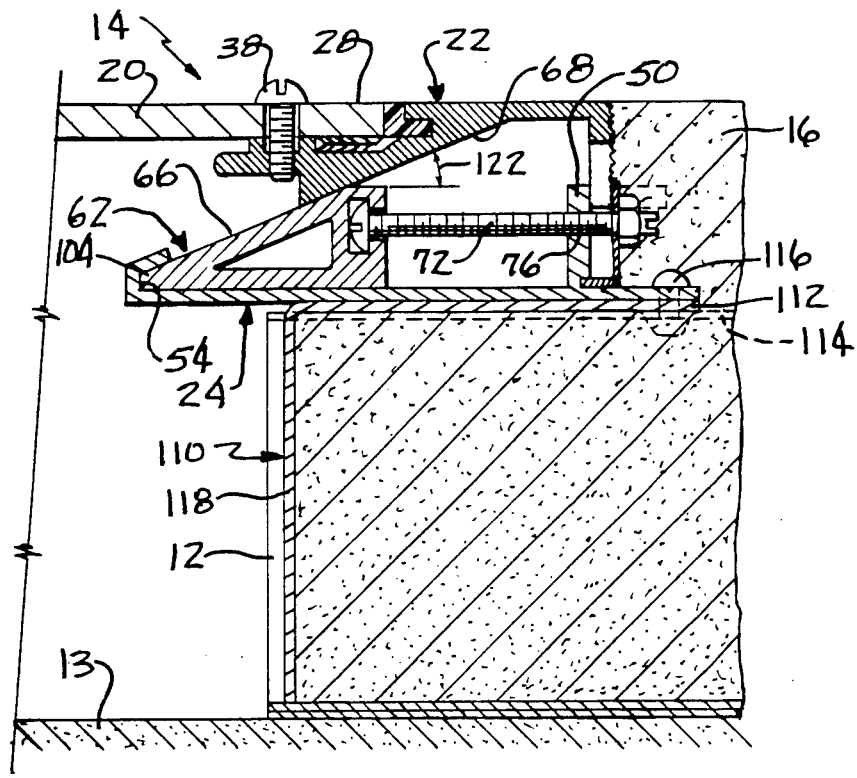
FIG. 5 is a cross-sectional view, taken along the line 5—5 of FIG. 1, showing one side of present trench assembly in an elevated position.

Referring to FIGS. 4 and 5, the present trench assembly 14 is shown installed over the metal cellular units 12. Closure means 110 is provided having a horizontal leg 112 and a vertical leg 118. The horizontal leg 112 overlies the crests 114 of the metal cellular units 12. The base member 24 overlies the horizontal leg 112, the base member 24 and the horizontal leg 112 being secured to the crest 114 by pop rivets 116. As can best be seen in FIG. 8, the vertical leg 118 has a lower edge 120 which is profiled to match substantially the contour of the upper surface of the metal cellular unit 12 (FIG. 4). The vertical legs 118 depend downwardly into the trough between adjacent cells and preclude substantial ingress of the concrete 16 into the interior of the trench 14.

It will be observed in FIG. 4 and 5 that the cover plates 20 are fully supported during all phases of vertical adjustment. This is, the cover plate edges 28 rests on the side rails 22 which are fully supported by the wedge means 62, which in turn, are supported on the base member 24 and crests 114 of the metal cellular units 12. Consequently, the side rails 22 do not undergo structural rotation which has been evidenced by most other trench systems. Moreover, the present trench assembly 14 is a practical system for use in a floor structure wherein a minimum of one inch of concrete fill is provided above the plane of the crests 114 of the metal cellular units 12.

Vertical adjustment of the side rails 22 is accomplished by rotating the threaded members 72 in the appropriate direction whereby the wedge means moves to the right in FIG. 4 and to the left in FIG. 5 relative to the base member 24. The confronting faces 66, 68 of the wedge means 62 and side rail 22 are inclined or sloped relative to the horizontal at an angle indicated at 122 in FIG. 5 of about 20 angular degrees. Lateral displacement of the wedge means 62 is limited by having the leading edge 104 thereof engage the receiving groove 54.

Figure 6:
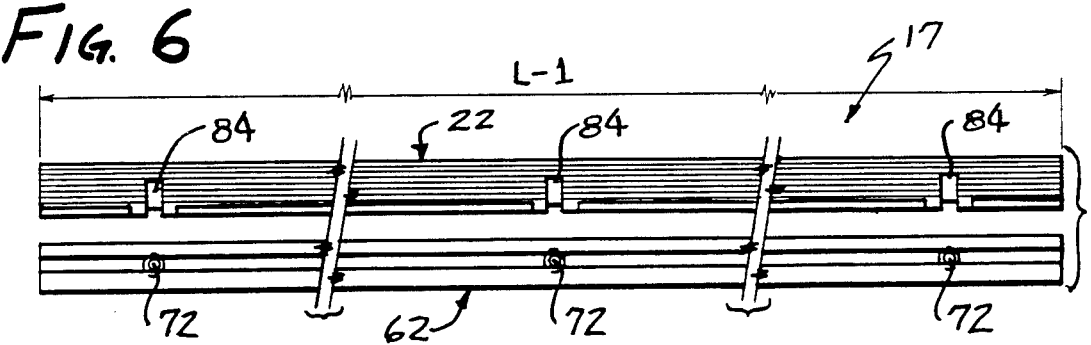
FIG. 6 is a side view of a side rail and associated wedge means.

Referring to FIGS. 3 and 6, the side rails 22, the wedge means 62 and the base member 24 preferably are formed from aluminum by extrusion methods. Alternatively, the components 22, 62 and 24 could instead, by formed from suitable plastic materials. The side rail 22, the wedge means 62 and the base member 24 may be to coextensive in length and may be provided as a unit 17 having a length L-1 (FIG. 6) of about 6 feet. As shown in FIG. 6, the wedge means 62 is provided with three threaded members 72, and the side rail 22 is provided with three slots 84 for receiving the threaded members 72. The wedge means 62, when formed from aluminum, is flexible enough to allow differential leveling of the side rail 22 along the length of the trench 14.

Figure 7:
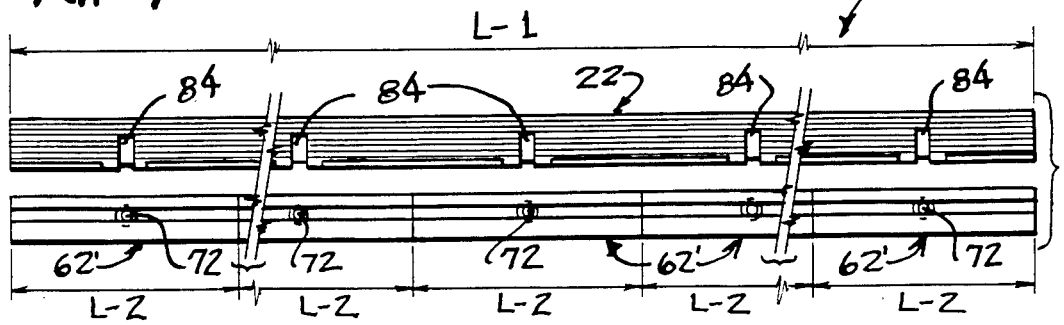
FIG. 7 is a side view of a side rail and associated wedge means formed from plural segments.

Should the wedge means 62 be formed from a stiffer metal, for example stainless steel, it is preferred, as in FIG. 7, that the wedge means be provided in segments 62' having a length L-2. In this instance, each of the wedge means segments 62' would be provided with a threaded member 72 to provide for individual displacement of the wedge means segments 62'.

Figure 8:
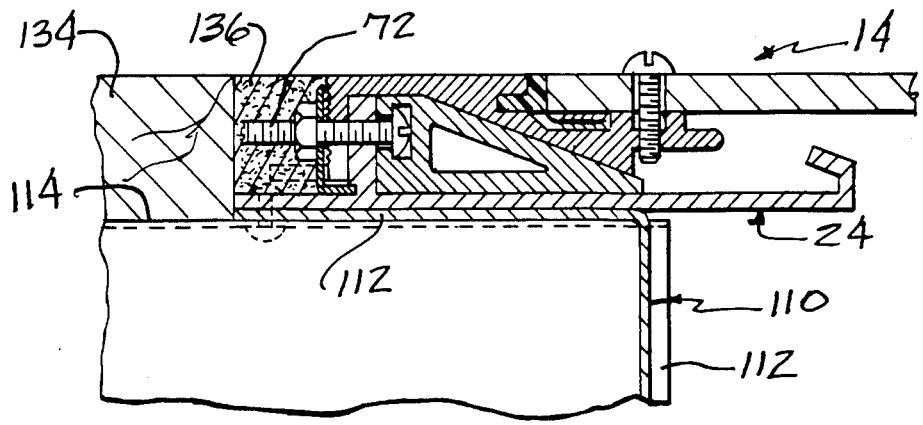
FIG. 8 is a fragmentary cross-sectional view, similiar to FIG. 4, illustrating the use of plywood fill over the crests of the cellular units.

Referring to FIG. 8, flooring such a plywood panels 134 may be used instead of a concrete layer. In this instance, the threaded member 72 is broken off as shown to allow the panels 134 to abut the edges of the base member 24 and the upper leg 112 of the closure means 110. The panels 134 overlie the crests 114 of the cellular members 12. A suitable filler 136 is provided to fill the space between the confronting edges of the panel 134 and the trench assembly 14.

Figure 9:
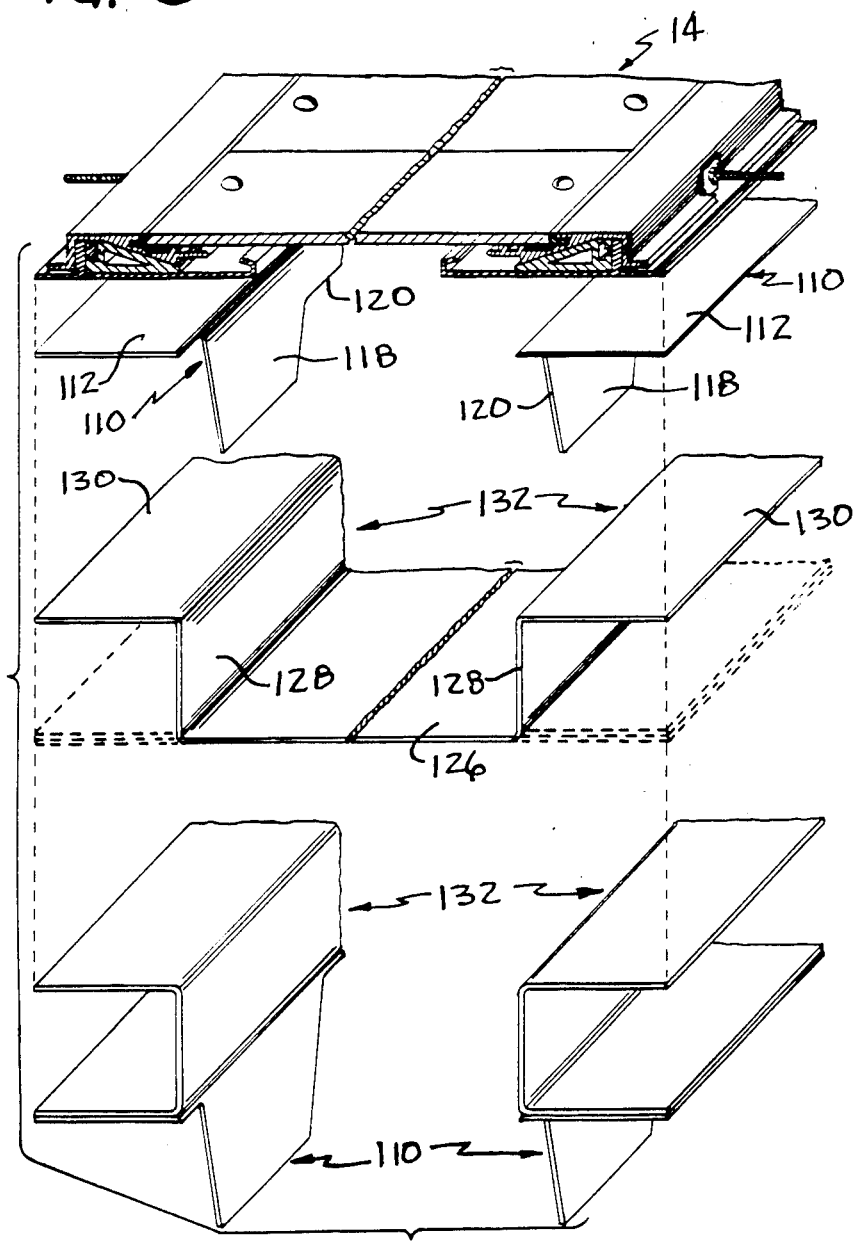
FIG. 9 is a fragmentary isometric view of the present trench assembly illustrating alternative embodiments of closure means and base pans.

Referring to FIG. 9, the present trench assembly 14 may be used in combination with the closure means 110 as described above. Alternatively, the trench assembly 14 may be employed in combination with a conventional U-shaped base pan 124 comprising a central web 126, upstanding side walls 128 and outwardly extending flanges 130. Equivalents of the conventional U-shaped base pan 124 may be provided. For example, as illustrated in part in dotted outline in FIG. 9, a separate central web 126 may be provided wherein C-shaped elements 132 are secured along the opposite longitudinal edges of the central web 126. As a further alternative, the C-shaped elements 132 may be combined with closure means 110.

Reverting to FIG. 3, the trench assembly 14 may be assembled by threading the threaded members 72 into the threaded opening 76 of the upstanding wall portion 50. Thereafter the heads 74 of the threaded members 72 are introduced into the S-shaped groove 78 of the wedge means 62. Thereafter, the side rail 22 is installed such that the threaded members 72 extend through the slots 84 and the wall portion 40 thereof is outboard of the upstanding wall portion 50. The elements 22, 62 and 24 are retained is assembled relation by applying the spring clips 90 on the threaded member 72 such that the sharp upper edge 98 engages the serrations 44 of the side rails 22 and such that the lower flange 96 engages the lengthwise groove 97 in the base member 24. The nuts 100 are applied to the threaded members 72 and tightened down.

An appropriate number of trench units 17 are shipped to the field. Each unit 17 is placed over the closure means 110. Utilizing the drill guide groove 58, suitable openings are drilled through the base member 24 the closure means 110 and the crests 114 of the cellular units 12 and the assembly is secured by pop rivets 116. After the trench assembly 14 is secured in position, proper upward adjustment is accomplished by turning the threaded member 72 so that the wedge means 62 are displaced in a horizontal direction thereby raising the side rails 22 to the appropriate level. The concrete 16 may then be poured and allowed to harden.

I claim:

1. In an electrical trench assembly having opposite sides and a cover plate spanning the distance between said opposite sides, the improvement comprising:

each of said opposite sides comprising:
a side rail supporting one end of said cover plate and having a rail lower face;
a base member beneath side rail and having a base upper face; and
adjustment means acting directly on said rail lower face for vertically displacing said side rail relative to said base member, said adjustment means being displaceable horizontally in a direction transverse to said side rail, being coextensive in length with said side rail, and being operable from the exterior said trench assembly.

2. The improvement as defined in claim 1 including stop means limiting vertical displacement of said side rail.

3. The improvement as defined in claim 1 wherein said adjustment means comprises:
wedge means overlying said base upper face and supporting said side rail, and
displacement means for moving said wedge means laterally toward and away from said side rail.

4. The improvement as defined in claim 3 wherein said wedge means comprises plural segments, each including a said adjustment means for moving the segment laterally of said base member independently of the other of said segments.

5. The improvement as defined in claim 3 wherein said rail lower face is inclined relative to said base upper face and said wedge means presents a wedge upper face in surface engagement with and slidable relative to said lower face.

6. The improvement defined in claim 5 wherein said rail lower face and said wedge upper face of each of said opposite sides are inclined inwardly toward the opposite side.

7. In an electrical trench assembly having opposite sides and a cover plate spanning the distance between said opposite sides, the improvement comprising:
each of said opposite sides comprising:
a side rail supporting one end of said cover plate and having a rail lower face;
a base member beneath side rail and having a base upper face;
horizontally displaceable adjustment means acting directly on said rail lower face for vertically displacing said side rail relative to said base member;
said adjustment means comprising:
wedge means overlying said base upper face and supporting said side rail, and
displacement means for moving said wedge means laterally toward and away from said side rail;
said displacement means comprising:
said base member presenting an upstanding wall portion having a threaded opening; and
a generally horizontal threaded member having one end rotatably connected to said wedge means and being threadedly engaged with said threaded opening.

8. The improvements as defined in claim 7 including lock means locking said side rail in vertically adjusted position.

9. In an electrical trench assembly having opposite sides and a cover plate spanning the distance between said opposite sides, the improvement comprising:
each of side opposite sides comprising:
a side rail supporting one end of said cover plate and having a rail lower face;
a base member beneath side rail and having a base upper face;
horizontally displaceable adjustment means acting directly on said rail lower face for vertically displacing said side rail relative to said base member; and
guide means precluding movement of said side rail in a direction transverse to said side rail during vertical movement thereof.

10. The improvement as defined in claim 9 wherein said guide means comprises:
said base member presenting an upstanding wall portion having a face; and
said side rail presenting a depending wall portion confronting said face of said upstanding wall portion.

11. In an electrical trench assembly having opposite sides and a cover plate spanning the distance between said opposite sides, the improvement comprising:
each of said opposite sides comprising:
a base member having a base upper face;
a side rail disposed above said base member and supporting one edge of said cover plate;
wedge means interposed between said base member and said side rail;
said side rail and said wedge means having parallel faces in contact with each other and inclined relative to said base upper face;
displacement means for moving said wedge means laterally toward and away from said side rail thereby adjusting the height of said side rail above said base member; and
stop means limiting lateral movement of said wedge means.

12. In an electrical wiring distributing floor structure including a generally parallel wire distributing cells; a trench assembly extending transversely of said cells and having opposite sides and a cover plate spanning the distance between said opposite sides; and a finishing layer surrounding at least two sides of said trench assembly and covering said cells; the improvement comprising:
each of said opposite sides comprising:
a side rail supporting one edge of said cover plate and having a rail lower face;
a base member beneath side rail;
adjustment means acting directly on said rail lower face for vertically displacing said side rail relative to said base member, said adjustment means being displaceable horizontally in a direction transverse to said side rail, being coextensive in length with said side rail, and being operable from the exterior of said trench assembly.

* * * * *